United States Patent
Kang (10) Patent No.: US 11,536,577 B2
(45) Date of Patent: Dec. 27, 2022

(54) CAR-SHARING SERVICE DEVICE AND METHOD OF OPERATING SAME

(71) Applicant: SK PLANET CO., LTD., Gyeonggi-do (KR)

(72) Inventor: Ki Chon Kang, Seoul (KR)

(73) Assignee: SK PLANET CO., LTD., Gyeonggi-do (KR)

(*) Notice: Subject to any disclaimer, the term of this patent is extended or adjusted under 35 U.S.C. 154(b) by 344 days.

(21) Appl. No.: 16/502,146

(22) Filed: Jul. 3, 2019

(65) Prior Publication Data

US 2020/0011681 A1 Jan. 9, 2020

(30) Foreign Application Priority Data

Jul. 4, 2018 (KR) .................. 10-2018-0077931

(51) Int. Cl.
*G01C 21/34* (2006.01)

(52) U.S. Cl.
CPC ..... *G01C 21/3438* (2013.01); *G01C 21/3492* (2013.01)

(58) Field of Classification Search
CPC ...................................................... G06Q 50/30
See application file for complete search history.

(56) References Cited

U.S. PATENT DOCUMENTS

| | | | | |
|---|---|---|---|---|
| 9,569,740 B2* | 2/2017 | Lord | ................ | G06Q 10/06311 |
| 10,013,986 B1* | 7/2018 | Bhaya | ................ | G10L 15/30 |
| 2004/0158483 A1* | 8/2004 | Lecouturier | ................ | G06Q 10/025 |
| | | | | 705/6 |
| 2010/0174474 A1* | 7/2010 | Nagase | ................ | G08G 1/01 |
| | | | | 701/118 |
| 2012/0233188 A1* | 9/2012 | Majumdar | ................ | G06F 16/367 |
| | | | | 707/756 |
| 2013/0179205 A1* | 7/2013 | Slinin | ................ | G06Q 10/06 |
| | | | | 705/7.13 |
| 2014/0047024 A1* | 2/2014 | Karamchedu | ................ | G06Q 50/30 |
| | | | | 709/204 |
| 2016/0292596 A1* | 10/2016 | Gaitan | ................ | G06Q 10/101 |
| 2016/0321771 A1* | 11/2016 | Liu | ................ | G01C 21/3438 |
| 2017/0169366 A1* | 6/2017 | Klein | ................ | G06Q 50/30 |
| 2017/0270447 A1* | 9/2017 | Borean | ................ | G06Q 10/06313 |
| 2017/0337511 A1* | 11/2017 | Shroff | ................ | G06F 16/9535 |
| 2018/0060988 A1* | 3/2018 | Klenk | ................ | G06Q 50/30 |
| 2018/0121828 A1* | 5/2018 | Keysers | ................ | G06N 20/00 |
| 2018/0121847 A1* | 5/2018 | Zhao | ................ | G06Q 10/06315 |
| 2018/0158166 A1* | 6/2018 | Tulabandhula | ................ | G06Q 50/30 |
| 2018/0165731 A1* | 6/2018 | Gopalakrishnan | ................ | G06Q 30/0605 |

* cited by examiner

*Primary Examiner* — Maceeh Anwari
*Assistant Examiner* — Jacob Daniel Underbakke
(74) *Attorney, Agent, or Firm* — Ked & Associates, LLP (57) ABSTRACT

Disclosed are a car-sharing service device and a method of operating the same capable of improving convenience of the use of a car-sharing service and increasing participation in the service by providing an environment in which targets requiring the car-sharing service are specified and the common use of a shared car is recommended to each of the specified targets.

17 Claims, 8 Drawing Sheets

FIG. 1

[particular area (densely populated area)]

[car-sharing service device]

CAR-SHARING SERVICE DEVICE AND METHOD OF OPERATING SAME

CROSS-REFERENCE TO RELATED APPLICATIONS

This application is based upon and claims the benefit of priority from Korean Patent Application No. 10-2018-0077931, filed on Jul. 4, 2018, the entire contents of which are incorporated herein by reference.

BACKGROUND OF THE INVENTION

1. Field of the invention

The present disclosure relates to a technology for determining target users requiring a car-sharing service and recommending the common use of a shared vehicle to each of the determined target users.

2. Description of the Prior Art

A sharing-economy service may be defined as a goods-using service based on community between a lender and a borrower.

Unlike conventional rental services, the sharing-economy service provides a desired service at a desired time and place at lower cost, and is thus spotlighted as a competitive service that may replace the position of conventional services.

The sharing-economy service is strongly competitive due to its economic efficiency and convenience. In addition, the sharing-economy service is also differentiated in that limited resources can be effectively used and sustainable growth can be achieved.

Currently released sharing-economy services may be classified according to the entity that operates the sharing-economy service, such as enterprises (B2C) and users (C2C). The car-sharing service may be one of the most representative example of sharing-economy services that have been introduced at present.

The car-sharing service is similar to the existing rental car service, but, unlike the rental car service, has advantages in that a user of the car-sharing service does not require that a contract be written up in a complex form and in that the user may use the shared car at a desired time and place without going to a service company located far away to rent a car.

However, even though the car-sharing service is advantageous compared to the existing rental car service, there still are entry barriers to use of the service due to a series of service procedures in that the user must personally inquire about a car to be shared through the car-sharing service and perform settings to use the car, and this limit may be an obstacle to proliferation of the use of the car-sharing service.

Accordingly, the present disclosure proposes a technology for improving convenience of the use of the car-sharing service and increasing participation in the service based on recommendation of the common use of a shared car.

SUMMARY OF THE INVENTION

The present disclosure has been made in order to solve the above-mentioned problems with the prior art, and an aspect of the present disclosure is to provide an environment in which target users requiring a car-sharing service are identified and the common use of a shared car is recommend to each of the identified target users.

In accordance with an aspect of the present disclosure, a car-sharing service device is provided. The car-sharing service device includes: a processor configured to process to provide a car-sharing service; and a memory configured to store at least one command executed through the processor, wherein the at least one command includes: a generation command of generating a sharing service group to use a shared car determined according to a moving path of the shared car based on residence information of subscriber terminals located in a particular area; and a control command of providing shared-car information to each of the subscriber terminals within the sharing service group and allowing the subscriber terminals to use the shared car.

Specifically, the at least one command may further include a determination command of determining whether to initiate the car-sharing service based on traffic condition information in the particular area at a particular time.

Specifically, the traffic condition information may be identified from a result of analysis of an image acquired for the particular area, and the determination command may include determining to initiate the car-sharing service when a number of people waiting for a public transportation is larger than a reference number of people or when a proportion of the transportation to all cars is smaller than a set proportion according to the result of analysis of the image.

Specifically, the generation command may include determining a sharing service candidate group with subscriber terminals having proximity between residences closer than or equal to a threshold from the subscriber terminals located in the particular area and generating the sharing service group with at least some subscriber terminals that consent to the car-sharing service in real time from the subscriber terminals within the sharing service candidate group.

Specifically, the proximity between the residences may be determined based on at least one of information on whether the residence is located along a line from the particular area and the distance between the residence and a base area predefined in connection with the line.

Specifically, the moving path of the shared car may be set to have, as a destination, a residence corresponding to a particular subscriber terminal which is the farthest from the particular area among the subscriber terminals within the sharing service group and may be set to have, as stops, residences corresponding to the remaining subscriber terminals.

Specifically, the at least one command may further include a cost calculation command of calculating a sharing service cost according to the use of the shared car, and the sharing service cost may be calculated by applying a discount rate to a basic service cost based on moving distance for each subscriber terminal within the sharing service group, the discount rate being determined according to the number of stops before arrival at each residence.

In accordance with another aspect of the present disclosure, a method of operating a car-sharing service device is provided. The method includes: a generation step of generating a sharing service group to commonly use a shared car according to a moving path of the shared car based on residence information of subscriber terminals located in a particular area according to initiation of the car-sharing service; and a control step of providing shared-car information to each of the subscriber terminals within the sharing service group and allowing the subscriber terminals to commonly use the shared car.

Specifically, the method may further include a determination step of determining whether to initiate the car-sharing service based on traffic condition information in the particular area at a particular time before the generation step.

Specifically, the traffic condition information may be identified from a result of analysis of an image acquired in the particular area, and the determination step may include determining to initiate the car-sharing service when the number of people waiting for a transportation is larger than a reference number of people or when the proportion of the transportation to all cars is smaller than a set proportion according to the result of analysis of the image.

Specifically, the generation step may include determining a sharing service candidate group with subscriber terminals having proximity between residences closer than or equal to a threshold from the subscriber terminals located in the particular area and generating the sharing service group with at least some subscriber terminals that consent to the car-sharing service in real time from the subscriber terminals within the sharing service candidate group.

Specifically, the proximity between the residences may be determined based on at least one of information on whether the residence is located along a line from the particular area and a distance between the residence and a base area predefined in connection with the line.

According to a car-sharing service device and a method of operating the same according to an embodiment of the present disclosure, it is possible to guarantee convenience of common use of a car-sharing service and promote an increase in participation in the service by providing an environment in which target users requiring the car-sharing service are identified and the common use of a shared car is recommended to each of the identified target users.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

It should be noted that the technical terms in the specification are merely used for describing a specific embodiment but do not limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

Hereinafter, exemplary embodiments of the present disclosure will be described in detail with reference to the accompanying drawings, equal or similar elements are assigned an equal reference numeral, and an overlapping description thereof will be omitted. Further, in the following description of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the spirit of the present disclosure should not be construed as being limited by the accompanying drawings. In addition to the accompanying drawings, the spirit of the present disclosure should be construed to cover all modifications, equivalents, and alternatives thereof.

Hereinafter, an embodiment of the present disclosure will be described with reference to the accompanying drawings.

Figure 1:
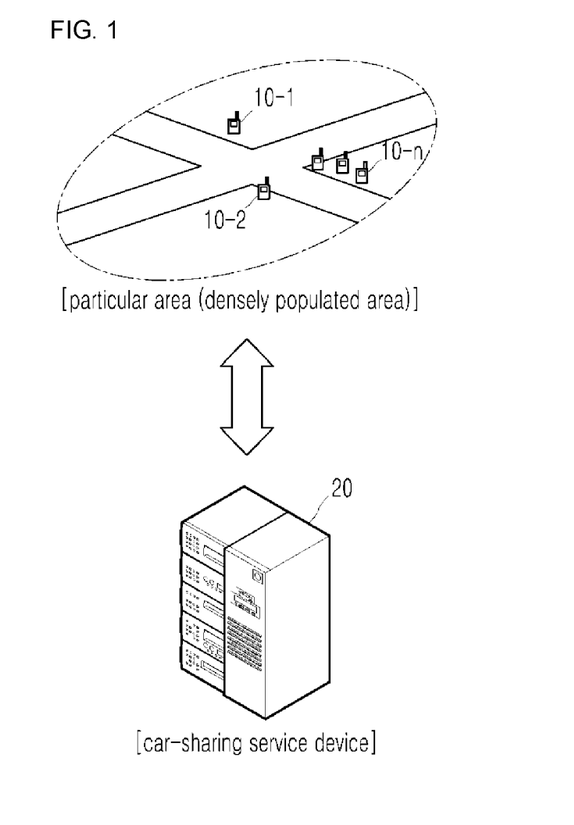
FIG. 1 schematically illustrates the configuration of a car-sharing service system according to an embodiment of the present disclosure.

FIG. 1 illustrates a car-sharing service system according to an embodiment of the present disclosure.

[0037] As illustrated in FIG. 1, the car-sharing service system according to an embodiment of the present disclosure may include a plurality of subscriber terminals 10-1, 10-2, . . . 10-n located in a particular area and a car-sharing service device 20 configured to provide a car-sharing service to at least some of the plurality of subscriber terminals 10-1, 10-2, . . . 10-n.

Each of the plurality of subscriber terminals 10-1, 10-2, . . . 10-n is a terminal having an application installed therein to receive a car-sharing service, and may periodically transmit its own location information to the car-sharing service device 20 through the application.

The application may be, for example, a dedicated application for receiving the car-sharing service or an application for another service associated (affiliated) with the car-sharing service.

The car-sharing service device 20 is a device that specifies targets requiring the car-sharing service among the plurality of subscriber terminals 10-1, 10-2, . . . 10-n and recommends the common use of a shared car to the specified targets.

The car-sharing service device 20 may be implemented in the form of, for example, a web server, a database server, or a proxy server, or may be implemented as a computerized system through installation of one or more of various pieces of software that allow a network load distribution mechanism or the service device to operate over the Internet or another network. Further, the network may be an http network, a private line, an intranet, or another network, and a connection between elements within a car-sharing service system according to an embodiment of the present disclosure may be made through a security network to prevent data from being compromised by an arbitrary hacker or another third party.

The car-sharing service system according to an embodiment of the present disclosure may specify at least some of the plurality of subscriber terminals 10-1, 10-2, . . . 10-$n$ located in the particular area as targets requiring the car-sharing service and recommend the common use of the shared car to the targets according to the above-described configuration.

Meanwhile, as mentioned in the prior art in connection with this, the car-sharing service is similar to the existing rental car service, but has an advantage in that the car-sharing service does not require that a contract be written up in a complex form and enables delivery of the car to be taken at a desired time and place in order to use the car without going to a service company located far away.

However, even though the car-sharing service has advantages compared to the existing rental car service, there are still entry barriers to use of the service due to a series of service procedures in that the user must inquire about a car to be shared in person through the car-sharing service and perform settings to use the car, and this limit may be an obstacle to proliferation of the use of the car-sharing service.

Accordingly, an embodiment of the present disclosure proposes a technology for guaranteeing convenience of the use of the car-sharing service and increasing participation in the service based on the recommendation of the common use of the shared car and, hereinafter, the configuration of the car-sharing service device 20 for implementing the technology will be described in more detail.

Meanwhile, for helping in understanding of the description, the configuration of the plurality of subscriber terminals 10-1, 10-2, . . . , 10-$n$ will be described prior to the description of the car-sharing service device 20.

Since each of the plurality of subscriber terminals 10-1, 10-2, . . . , 10-$n$ has the same configuration, they are all commonly referred to as the subscriber terminal 10.

Figure 2:
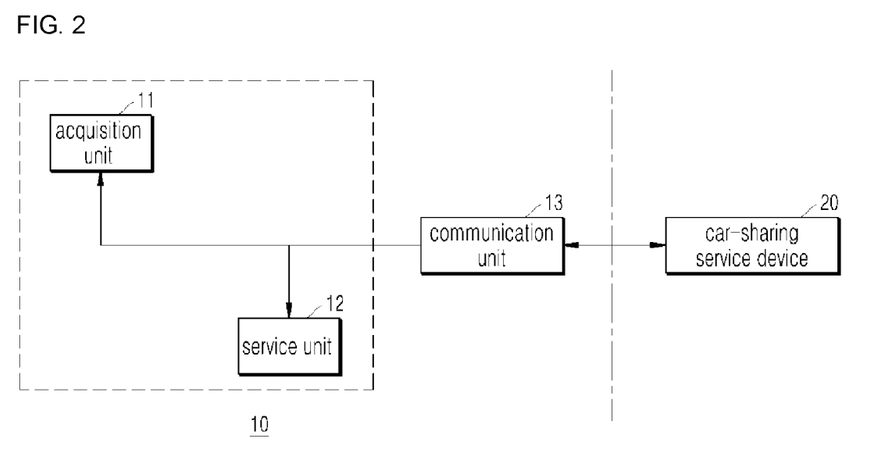
FIG. 2 is a block diagram schematically illustrating a subscriber terminal according to an embodiment of the present disclosure.

FIG. 2 is a block diagram of the subscriber terminal 10 according to an embodiment of the present disclosure.

As illustrated in FIG. 2, the subscriber terminal 10 according to an embodiment of the present disclosure may include an acquisition unit 11 configured to acquire location information and a service unit 12 configured to receive a car-sharing service from the car-sharing service device 20.

All or at least some of the elements of the subscriber terminal 10 including the acquisition unit 11 and the service unit 12 may be implemented in the form of a software (application) module or a hardware module executed by a processor or a combination of the software module and the hardware module.

Meanwhile, the subscriber terminal 10 according to an embodiment of the present disclosure may further include a communication unit 13 configured to serve an RF function for actual communication with the car-sharing service device 20 as well as the above-described elements.

For reference, the configuration of the communication unit 13 is the configuration corresponding to a communication unit 1310 described with reference to FIG. 3, and a detailed description thereof will be made below.

As a result, the subscriber terminal 10 according to an embodiment of the present disclosure may receive the car-sharing service from the car-sharing service device 20 based on the above-described configuration and, hereinafter, the elements within the subscriber terminal 10 for implementing the car-sharing service will be described in more detail.

The acquisition unit 11 performs a function of acquiring location information.

More specifically, the acquisition unit 11 acquires location information of the subscriber terminal 10 and transfers the location information to the car-sharing service device 20.

At this time, the acquisition unit 11 may acquire location information according to a period configured in an application or a request from the car-sharing service device 20.

Here, the location information may include, for example, AP access information and GPS information, and may be transferred to the car-sharing service device 20 together with visual information of the acquired location information while matching identification information (a subscriber ID) of the subscriber terminal 10.

The service unit 12 performs a function of receiving the car-sharing service.

More specifically, when the subscriber terminal 10 is specified as a target requiring the car-sharing service according to the result of the determination by the car-sharing service device 20 based on the transferred location information, the car-sharing service device 20 recommends the common use of the shared car to the service unit 12.

Here, the determination of whether the target is a target to receive the car-sharing service may be performed based on residence information that is managed while matching identification information (a subscriber ID) of the subscriber terminal 10.

In connection with this, when it is identified that the plurality of subscriber terminals 10-1, 10-2, . . . , 10-$n$ is located in the particular area based on the received location information, the car-sharing service device 20 may generate a sharing service group for the common use of the shared car in consideration of the moving path of the shared car on the basis of the residence information of each of the plurality of subscriber terminals 10-1, 10-2, . . . , 10-$n$.

Further, when the sharing service group is generated, the car-sharing service device 20 may provide shared-car information to each subscriber terminal within the generated sharing service group and allow the subscriber terminal to commonly use the shared car.

At this time, the shared-car information may include, for example, the location of the shared car and information on other subscriber terminals within the sharing service group that use the shared car together (for example, phone numbers, residences, and personal information).

Meanwhile, prior to generating the sharing service group and providing the shared-car information, the car-sharing service device 20 may preferentially determine whether to initiate the car-sharing service.

In connection with this, the car-sharing service device 20 may determine whether to initiate the car-sharing service based on traffic condition information in the particular area in which the plurality of subscriber terminals 10-1, 10-2, . . . , 10-$n$ is located at a particular time (for example, a time at which it is difficult to take a taxi since public transportation (ex. a tax, a bus) is not available).

At this time, the car-sharing service device 20 may identify traffic condition information by analyzing an image (for example, a CCT image or a photo) acquired from the particular area in which the plurality of subscriber terminals 10-1, 10-2, . . . , 10-$n$ is located, and when the number of people waiting for a taxi is larger than the reference number of people or when the proportion of taxis to all cars is smaller than a preset proportion based on a result of the identification of the traffic condition information through the analysis, may determine to initiate the car-sharing service.

That is, when the plurality of subscriber terminals 10-1, 10-2, . . . , 10-n located in the particular area is identified at the particular time (for example, a time at which it is difficult to take a taxi since public transportation is not available), the car-sharing service device 20 may determine whether to initiate the car-sharing service based on traffic condition information in the corresponding area, and when it is determined to initiate the car-sharing service, may generate a sharing service group to use a shared car together and provide shared-car information to each subscriber terminal within the generated sharing service group.

As a result, when the subscriber terminal 10 is specified as the target requiring the car-sharing service, that is, when the subscriber terminal 10 belongs to the sharing service group according to the operation characteristics in the car-sharing service device 20, the service unit 12 may receive shared-car information from the car-sharing service device 20 and guide the subscriber to use the shared car.

Meanwhile, each element within the subscriber terminal 10 may be implemented in the form of a software module a hardware module executed by the processor, or a combination of the software module and the hardware module.

As described above, the software module and the hardware module, executed by the processor, and the combination of the software module and the hardware module may be implemented by a hardware system (for example, a computer system).

Accordingly, hereinafter, a hardware system 1000 in which the subscriber terminal 10 according to an embodiment of the present disclosure is implemented in the form of hardware will be described with reference to FIG. 3.

For reference, the following description is an example of each element within the subscriber terminal 10 implemented as the hardware system 1000, and it should be noted that each element and the operation thereof may be different from those of an actual system.

Figure 3:
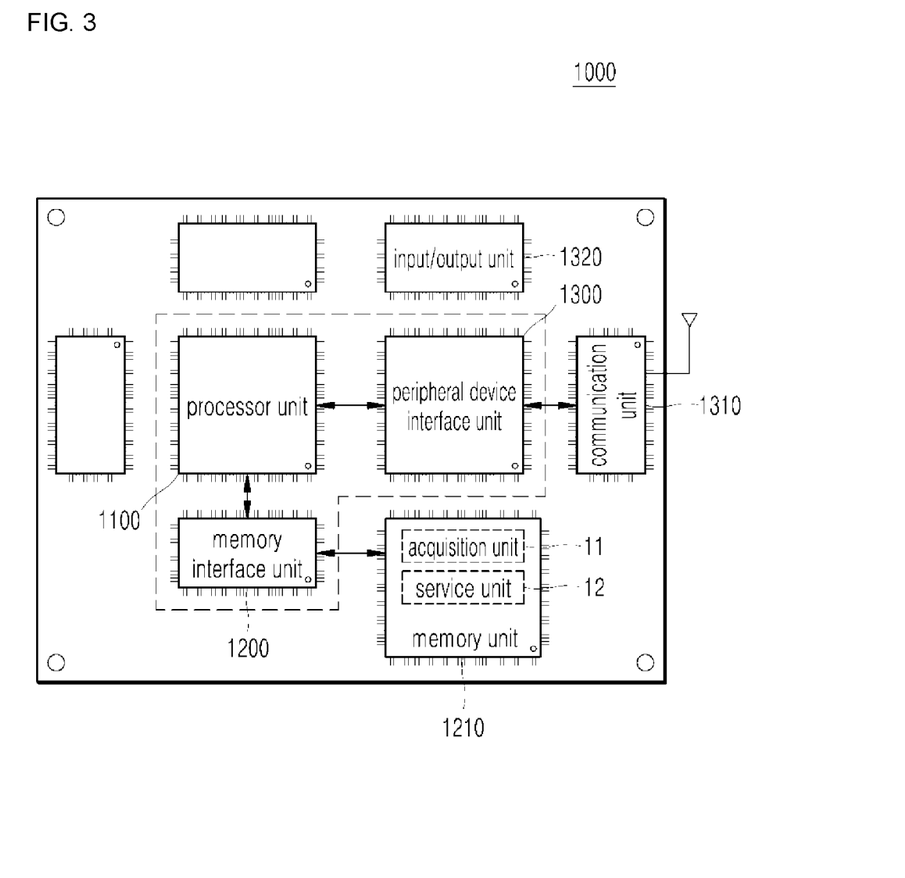
FIG. 3 illustrates a hardware system for implementing the subscriber terminal according to an embodiment of the present disclosure.

As illustrated in FIG. 3, the hardware system 1000 according to an embodiment of the present disclosure may include a processor unit 1100, a memory interface unit 1200, and a peripheral device interface unit 1300.

The respective elements within the hardware system 1000 may be individual elements, or may be integrated into one or more integrated circuits, and may be combined by a bus system (not shown).

The bus system is an abstraction indicating one or more individual physical buses, communication lines/interfaces, multi-drop, and/or point-to-point connections connected by bridges, adaptors, and/or controllers as appropriate.

The processor unit 1100 may serve to execute various software modules stored in the memory unit 1210 by communicating with the memory unit 1210 through the memory interface unit 1200 in order to perform various functions in the hardware system.

The memory unit 1210 may store the acquisition unit 11 and the service unit 12, which are the elements within the subscriber terminal 10 described with reference to FIG. 2, in the software module form, and may further store an Operating System (OS).

The operating system (for example, an embedded operating system such as iOS, Android, Darwin, RTXC, LINUX, UNIX, OSX, WINDOWS, or VxWorks) includes various procedures for controlling and managing general system tasks (for example, memory management, storage device control, and power management), an instruction set, a software component, and/or a driver, and serves to make communication between various hardware modules and software modules easy.

For reference, the memory unit 1210 includes a cache, a main memory, and a secondary memory, but is not limited thereto, and may include a memory layer structure. The memory layer structure may be implemented through a predetermined combination of, for example, RAM (for example, SRAM, DRAM, or DDRAM), ROM, FLASH, a magnetic and/or optical storage device (for example, a disk drive, a magnetic tape, a Compact Disk (CD), and a Digital Video Disc (DVD)).

The peripheral interface unit 1300 serves to enable communication between the processor unit 1100 and peripheral devices.

The peripheral device may provide different functions to the hardware system 1000 and may include, for example, a communication unit 1310 and an input/output unit 1320 according to an embodiment of the present disclosure.

The communication unit 1310 serves to provide a function of communication with another device. To this end, the communication unit 1310 may include, for example, an antenna system, an RF transceiver, one or more amplifiers, a tuner, one or more oscillators, a digital signal processor, a CODEC chipset, and a memory, but is not limited thereto, and may include a known circuit for performing the function.

Communication protocols supported by the communication unit 1310 may include, for example, Wireless LAN (WLAN), Digital Living Network Alliance (DLNA), Wireless broadband (WiBro), World interoperability for microwave access (WiMAX), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High-Speed Downlink Packet Access (HSDPA), High Speed Uplink Packet Access (HSUPA), IEEE 802.16, Long-Term Evolution (LTE), Long-Term Evolution-Advanced (LTE-A), Wireless Mobile Broadband Service (WMBS), Bluetooth, Radio Frequency Identification (RFID), Infrared Data Association (IrDA), Ultra-Wideband (UWB), ZigBee, Near Field Communication (NFC), Ultrasound Communication (USC), Visible Light Communication (VLC), Wi-Fi, and Wi-Fi Direct. Wired communication networks may include a wired Local Area Network (LAN), a wired Wide Area Network (WAN), Power-Line Communication (PLC), USB communication, Ethernet, serial communication, and optical fiber/coaxial cable, but are not limited thereto, and may include any protocol that can provide a communication environment with another device.

Further, the input/output unit 1320 may serve as a controller configured to control an I/O device interworking with other hardware systems and may serve to control a GPS for acquiring location information of the subscriber terminal 10 and a display for an interface with the subscriber in a car-sharing service process according to an embodiment of the present disclosure.

As a result, each element within the subscriber terminal 10 stored in the memory unit 1210 of the hardware system 1000 according to an embodiment of the present disclosure in the form of a software module may execute an interface with the communication unit 1310 and the input/output unit 1320 via the memory interface unit 1200 and the peripheral device interface unit 1300 in the form of instructions executed by the processor unit 1100, thereby receiving the car-sharing service.

The description of the configuration of the subscriber terminal 10 according to an embodiment of the present disclosure has been completed, and the configuration of the car-sharing service device 20 will be subsequently described.

Figure 4:
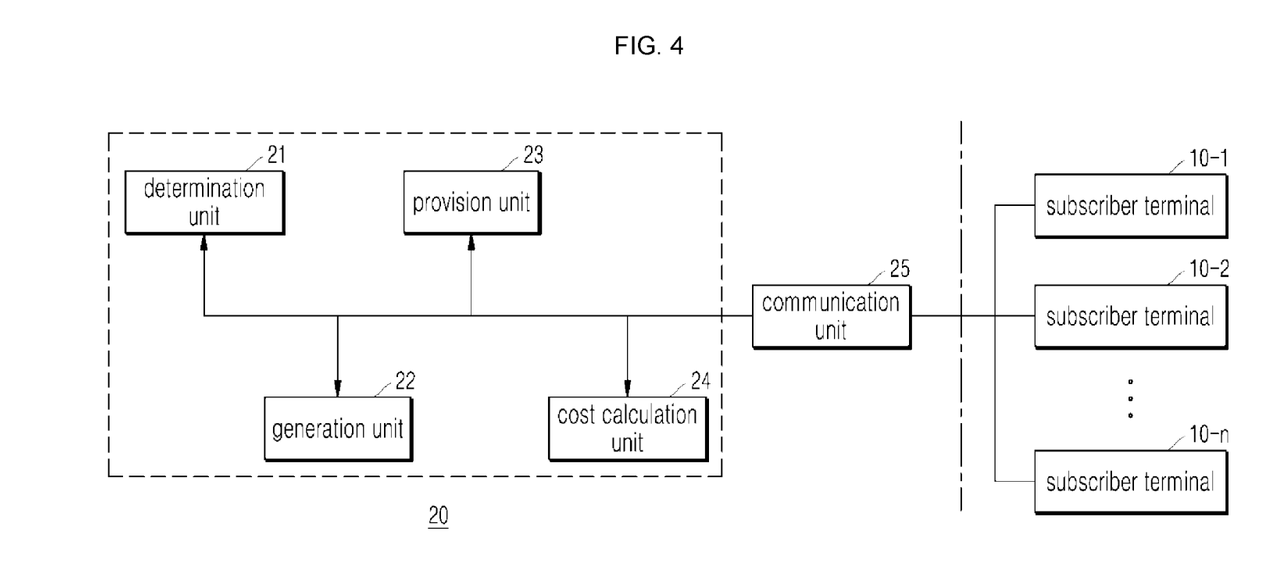
FIG. 4 is a block diagram schematically illustrating a car-sharing service device according to an embodiment of the present disclosure.

FIG. 4 is a block diagram schematically illustrating the car-sharing service device 20 according to an embodiment of the present disclosure.

As illustrated in FIG. 4, the car-sharing service device 20 according to an embodiment of the present disclosure may include a generation unit 22 configured to generate a sharing service group and a provision unit 23 configured to provide shared-car information.

Further, the car-sharing service device 20 according to an embodiment of the present disclosure may further include a determination unit 21 configured to determine whether to initiate the car-sharing service and a cost calculation unit 24 configured to calculate a sharing service cost according to the use of the car-sharing service, as well as the above-described elements.

All or at least some of the elements of the car-sharing service device 20 including the determination unit 21, the generation unit 22, the provision unit 23, and the cost calculation unit 24 may be implemented in the form of a software module or a hardware module executed by the processor or a combination of the software module and the hardware module.

Here, the software module may be understood as, for example, an instruction executed by the processor that controls calculations within the car-sharing service device 20, and the instruction may have a form of being installed in the memory within the car-sharing service device 20.

Meanwhile, the car-sharing service device 20 according to an embodiment of the present disclosure may further include a communication module 25, which is an RF module configured to serve actual communication with the subscriber terminal 10.

For reference, since the configuration of the communication unit 25 is the configuration corresponding to a communication unit 2310 to be described with reference to FIG. 5, a detailed description thereof will be made below.

As a result, the car-sharing service device 20 according to an embodiment of the present disclosure may recommend the common use of a shared car according to the above-described configuration, and, hereinafter, each element within the car-sharing service device 20 for implementing the common use of the shared car will be described in detail.

The determination unit 21 performs a function of determining whether to initiate the car-sharing service.

More specifically, when the plurality of subscriber terminals 10-1, 10-2, . . . , 10-*n* located in a particular area (for example, a densely populated area) is identified based on location information received from the plurality of subscriber terminals 10-1, 10-2, . . . , 10-*n* at a particular time (for example, a time at which it is difficult to take a taxi since public transportation is not available), the determination unit 21 determines whether to initiate the car-sharing service based on traffic condition information in the corresponding area.

At this time, the car-sharing service device 20 may identify traffic condition information by analyzing an image (for example, a CCT image or a photo) acquired from the particular area in which the plurality of subscriber terminals 10-1, 10-2, . . . , 10-*n* is located, and when the number of people waiting for a taxi is larger than the reference number of people or the proportion of taxis to all cars is smaller than a preset proportion based on a result of the identification of the traffic condition information through the analysis, may determine to initiate the car-sharing service.

The generation unit 22 performs a function of generating the sharing service group.

More specifically, when it is identified that the plurality of subscriber terminals 10-1, 10-2, . . . , 10-*n* is located in the particular area (for example, the densely populated area) at the particular time (for example, a time at which it is difficult to take a taxi since public transportation is not available) and it is determined to initiate the car-sharing service on the basis of traffic condition information in the corresponding area, the generation unit 22 generates a sharing service group to commonly use the shared car in consideration of a moving path of the shared car based on residence information managed while matching, in advance, identification information of each of the subscriber terminals 10-1, 10-2, . . . , 10-*n*.

At this time, the generation unit 22 may generate a sharing service candidate group based on proximity between residences of the subscriber terminals before generating the sharing service group, and may then generate the sharing service group with at least some subscriber terminals that consent to the car-sharing service in real time among the subscriber terminals within the sharing service candidate group.

Here, the proximity between residences may be determined based on information indicating whether residence of the subscriber terminal is located along an extrapolated line of an azimuth based on the particular area in which the subscriber terminals 10-1, 10-2, . . . , 10-*n* are located and a distance between the residence and a predefined base area (for example, a subway station or a landmark) in connection with the extrapolated line of the corresponding azimuth.

The proximity between residences is to determine the shortest moving path of the shared car for the moving path, and may become grounds to determine how close residences of respective subscriber terminals are located.

As a result, the generation unit 22 determines the sharing service candidate group with subscriber terminals having proximity between residences closer than or equal to a threshold value among the plurality of subscriber terminals 10-1, 10-2, . . . , 10-*n* located in the particular area, and further generates the sharing service group with at least some subscriber terminals that consent to the car-sharing service in real time among the subscriber terminals within the sharing service candidate group.

Meanwhile, the moving path of the shared car determined for the sharing service group may be set to have, as the destination, a residence corresponding to a particular subscriber terminal, which is the farthest from a particular area among the subscriber terminals within the sharing service group, and may be set to have, as stops, residences corresponding to the remaining subscriber terminals.

The provision unit 23 performs a function of providing shared-car information.

More specifically, when the sharing service group is generated, the provision unit 23 may allow the subscriber terminals within the sharing service group to commonly use the shared car by providing the shared-car information to the subscriber terminals.

At this time, the shared-car information may include, for example, the location of the shared car and information on each subscriber terminal within the sharing service group that use the shared car together (for example, phone numbers, residences, and personal information).

The cost calculation unit 24 performs a function of calculating a sharing service cost according to the use of the shared car.

More specifically, the cost calculation unit 24 calculates the sharing service cost for each subscriber terminal within the sharing service group.

At this time, the cost calculation unit 24 may charge a basic service cost per moving distance to each subscriber terminal within the sharing service group and calculate the sharing service cost for each subscriber terminal by additionally applying a discount rate to the basic service cost according to the number of stops before arrival at each residence.

That is, the cost calculation unit 24 charges the basic service cost per moving distance to each subscriber terminal within the sharing service group and additionally applies a corresponding discount rate to the subscriber terminal that passes through a larger number of stops, thereby compensating for a time delay due to the stops in the light of costs.

Meanwhile, it has been mentioned that each element with the car-sharing service device 20 may be implemented in the form of a software module or a hardware module executed by the processor or a combination of a software module and a hardware module.

As described above, the software module and the hardware module executed by the processor, and the combination of the software module and the hardware module may be implemented by a hardware system (for example, a computer system).

Accordingly, a hardware system 2000 in which the car-sharing service device 20 according to an embodiment of the present disclosure is implemented in hardware form will be described below with reference to FIG. 5.

For reference, the following description is an example of the implementation of the hardware system 2000 in which each element within the car-sharing service device 20 is implemented, and it should be noted that each element and the operation thereof can be different from those of the actual system.

Figure 5:
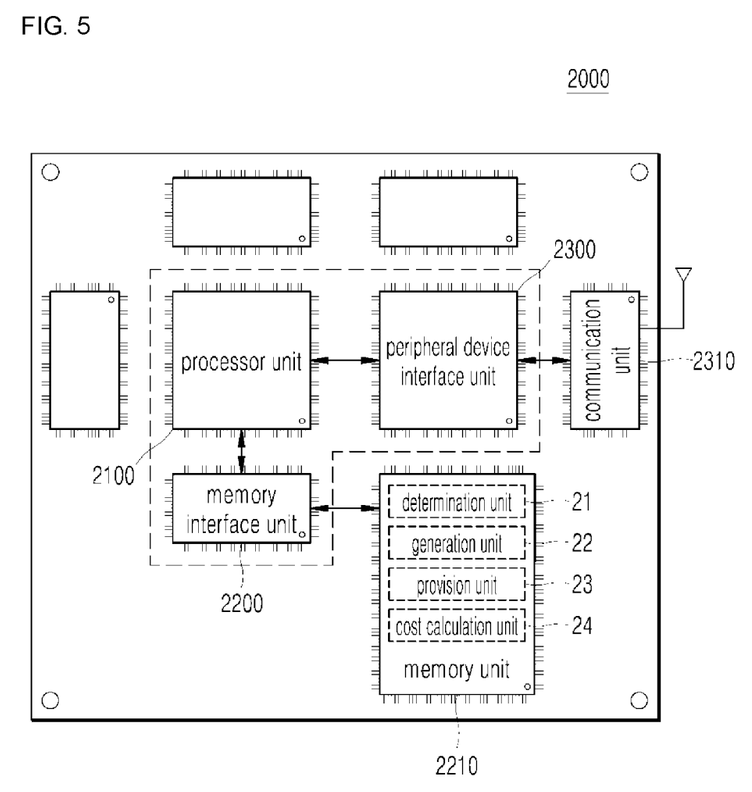
FIG. 5 illustrates a hardware system for implementing the car-sharing service device according to an embodiment of the present disclosure.

As illustrated in FIG. 5, the hardware system 2000 according to an embodiment of the present disclosure may include a processor unit 2100, a memory interface unit 2200, and a peripheral device interface unit 2300.

The respective elements within the hardware system 2000 may be individual elements, or may be integrated into one or more integrated circuits, and may be combined by a bus system (not shown).

The bus system is an abstraction indicating one or more individual physical buses, communication lines/interfaces, multi-drop, and/or point-to-point connections connected by bridges, adaptors, and/or controllers as appropriate.

The processor unit 2100 may serve to execute various software modules stored in the memory unit 2210 by communicating with the memory unit 2210 through the memory interface unit 2200 in order to perform various functions in the hardware system.

The memory unit 2210 may store the determination unit 21, the generation unit 22, the provision unit 23, and the cost calculation unit 24, which are the elements within the service device 20 described with reference to FIG. 4, in the form of a software module, and may further store an Operating System (OS).

The operating system (for example, an embedded operating system such as iOS, Android, Darwin, RTXC, LINUX, UNIX, OSX, WINDOWS, or VxWorks) includes various procedures for controlling and managing general system tasks (for example, memory management, storage device control, and power management), an instruction set, a software component, and/or a driver, and serves to make communication between various hardware modules and software modules easy.

For reference, the memory unit 2210 includes a cache, a main memory, and a secondary memory, but is not limited thereto, and may include a memory layer structure. The memory layer structure may be implemented through a predetermined combination of, for example, RAM (for example, SRAM, DRAM, or DDRAM), ROM, FLASH, a magnetic and/or optical storage device (for example, a disk drive, a magnetic tape, a Compact Disk (CD), and a Digital Video Disc (DVD)).

The peripheral interface unit 2300 serves to enable communication between the processor unit 2100 and peripheral devices.

The peripheral device may provide different functions to the hardware system 2000, and may include, for example, a communication unit 2310 according to an embodiment of the present disclosure.

The communication unit 2310 serves to provide a function of communication with another device. To this end, the communication unit 1310 may include, for example, an antenna system, an RF transceiver, one or more amplifiers, a tuner, one or more oscillators, a digital signal processor, a CODEC chipset, and a memory, but is not limited thereto, and may include a known circuit for performing the function.

Communication protocols supported by the communication unit 2310 may include, for example, Wireless LAN (WLAN), Digital Living Network Alliance (DLNA), Wireless broadband (WiBro), World interoperability for microwave access (WiMAX), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed-Downlink Packet Access (HSDPA), High Speed Uplink Packet Access (HSUPA), IEEE 802.16, Long-Term Evolution (LTE), Long-Term Evolution-Advanced (LTE-A), Wireless Mobile Broadband Service (WMBS), Bluetooth, Radio Frequency Identification (RFID), Infrared Data Association (IrDA), Ultra-Wideband (UWB), ZigBee, Near Field Communication (NFC), Ultrasound Communication (USC), Visible Light Communication (VLC), Wi-Fi, and Wi-Fi Direct. Wired communication networks may include a wired Local Area Network (LAN), a wired Wide Area Network (WAN), Power-Line Communication (PLC), USB communication, Ethernet, serial communication, and optical fiber/coaxial cable, but are not limited thereto, and may include any protocol that can provide a communication environment with another device.

As a result, each element within the car-sharing service device 20 stored in the memory unit 2210 of the hardware system 2000 according to an embodiment of the present disclosure in the form of a software module may execute an interface with the communication unit 2310 via the memory interface unit 2200 and the peripheral device interface unit 2300 in the form of instructions executed by the processor unit 2100, thereby recommending the common use of the shared car.

As described above, according to the car-sharing service system and each element within the system, it is possible to guarantee convenience of use of the car-sharing service and promote an increase in participation in the service by providing an environment in which targets requiring the car-sharing service may be specified and the common use of a shared car may be recommended to each of the specified targets.

Figure 6:
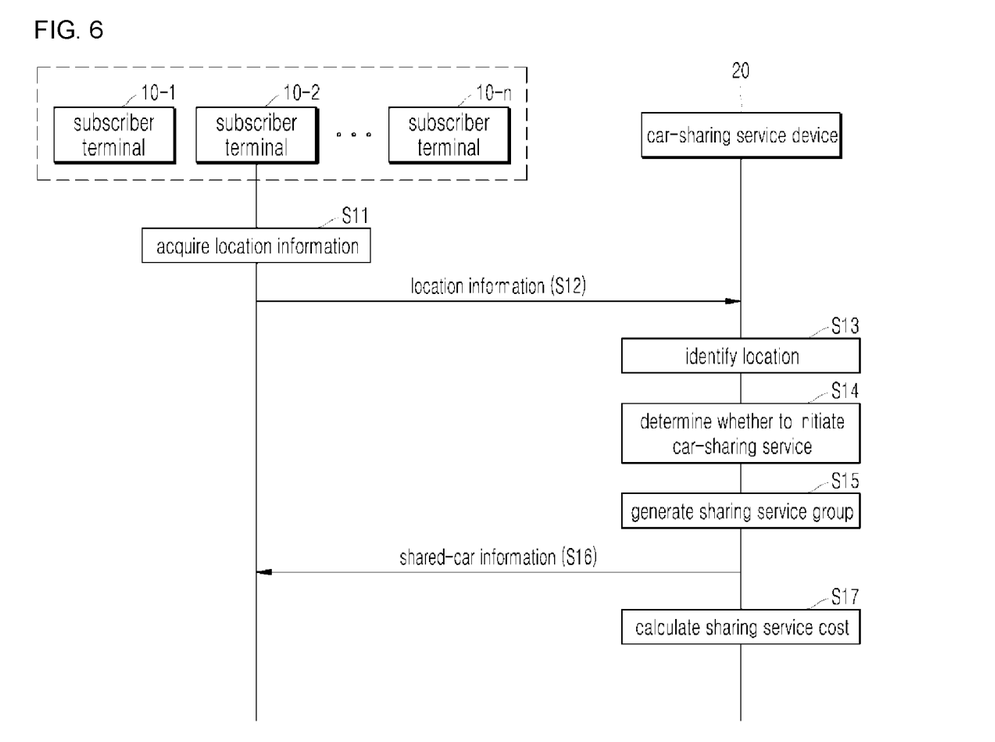
FIG. 6 is a flowchart schematically illustrating an operation flow in the car-sharing service system according to an embodiment of the present disclosure.

Hereinafter, an operation flow in the car-sharing service system according to an embodiment of the present disclosure will be described.

In connection therewith, FIG. 6 illustrates the operation flow in the car-sharing service system according to an embodiment of the present disclosure.

First, the plurality of subscriber terminals 10-1, 10-2, . . . , 10-n acquires location information and transfers the location information to the car-sharing service device 20 in S11 to S12.

At this time, each of the subscriber terminals 10-1, 10-2, . . . , 10-n may acquire location information according to a period configured in an application or a request from the car-sharing service device 20.

Here, the location information may include, for example, AP access information and GPS information, and may be transferred to the car-sharing service device 20 together with visual information of the acquired location information while matching identification information (subscriber IDs) of the subscriber terminals 10-1, 10-2, . . . , 10-n.

When it is identified that the subscriber terminals 10-1, 10-2, . . . , 10-n are located in a particular area based on the location information received at a particular time (for example, a time at which it is difficult to take a taxi since public transportation is not available), the car-sharing service device 20 determines whether to initiate the car-sharing service based on traffic condition information in the particular area in S13 to S14.

At this time, the car-sharing service device 20 may identify traffic condition information by analyzing an image (for example, a CCT image or a photo) acquired from the particular area in which the plurality of subscriber terminals 10-1, 10-2, . . . , 10-n is located, and when the number of people waiting for a taxi is larger than the reference number of people or the proportion of taxis to all cars is smaller than a preset proportion based on a result of the identification of the traffic condition information through the analysis, may determine to initiate the car-sharing service.

Further, when it is determined to initiate the car-sharing service, the car-sharing service device 20 generates a sharing service group to commonly use a shared car in consideration of a moving path of the shared car on the basis of residence information of each of the subscriber terminals 10-1, 10-2, . . . , 10-n in S15.

At this time, the car-sharing service device 20 may generate a sharing service candidate group based on proximity between residences of the subscriber terminals before generating the sharing service group, and may then generate the sharing service group with at least some subscriber terminals that consent to the car-sharing service in real time among the subscriber terminals within the sharing service candidate group.

Here, the proximity between residences may be determined based on information indicating whether a residence of the subscriber terminal is located along an extrapolated line of an azimuth based on the particular area in which the subscriber terminals 10-1, 10-2, . . . , 10-n are located and a distance between the residence and a predefined base area (for example, a subway station or a landmark) in connection with the extrapolated line of the corresponding azimuth.

The proximity between residences is used to determine the shortest path for the moving path of the shared car and may become grounds to determine how close residences of respective subscriber terminals are located.

As a result, the car-sharing service device 20 determines the sharing service candidate group with subscriber terminals having proximity between residences closer than or equal to a threshold value among the plurality of subscriber terminals 10-1, 10-2, . . . , 10-n located in the particular area, and further generates a sharing service group with at least some subscriber terminals that consent to the car-sharing service in real time among the subscriber terminals within the sharing service candidate group.

Thereafter, the car-sharing service device 20 provides shared-car information to each of the subscriber terminals within the generated sharing service group and allows the subscriber terminals to commonly use the shared car in S16.

At this time, the shared-car information may include, for example, the location of the shared car and information on other subscriber terminals within the sharing service group that use the shared car together (for example, phone numbers, residences, and personal information).

In connection with this, when at least some of the plurality of the subscriber terminals 10-1, 10-2, . . . , 10-n are specified as targets requiring the car-sharing service, that is, when at least some of the plurality of the subscriber terminals 10-1, 10-2, . . . , 10-n belong to the sharing service group, the car-sharing service device 20 transmits shared-car information to the subscriber terminals to guide the subscriber terminals to use the shared car.

Meanwhile, the cost calculation unit 24 of the car-sharing service device 20 may calculate a sharing service cost for each subscriber terminal within the sharing service group in S17.

At this time, the car-sharing service device 20 may charge a basic service cost per moving distance to each subscriber terminal within the sharing service group and calculate the sharing service cost for each subscriber terminal by additionally applying a discount rate to the basic service cost according to the number of stops before arrival at each residence.

That is, the cost calculation unit 24 charges the basic service cost per moving distance to each subscriber terminal within the sharing service group but additionally applies a corresponding discount rate to the subscriber terminal that passes a larger number of stops, thereby compensating for a time delay due to the stops in the light of costs.

Figure 7:
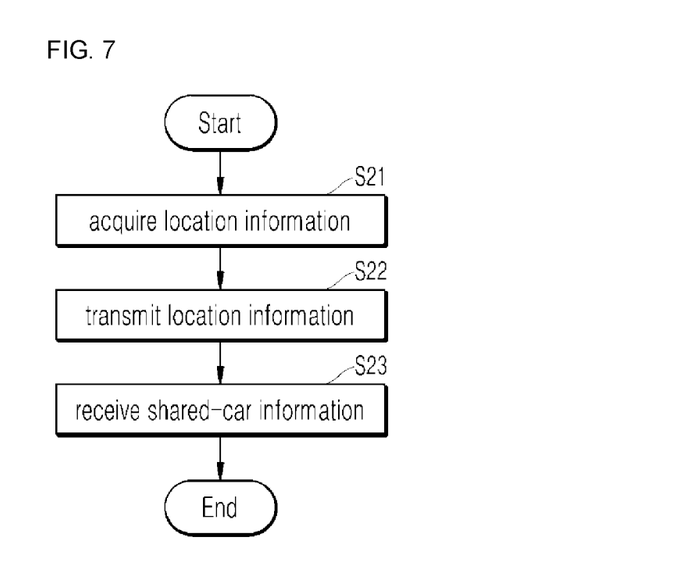
FIG. 7 is a flowchart schematically illustrating an operation flow in the subscriber terminal according to an embodiment of the present disclosure.

The description for the operation flow in the car-sharing service system according to an embodiment of the present disclosure has been completed, and the description of an operation flow in the subscriber terminal 10 will be subsequently made.

In connection with this, FIG. 7 illustrates the operation flow in the subscriber terminal 10 according to an embodiment of the present disclosure.

First, the acquisition unit 11 acquires location information of the subscriber terminal 10 and transfers the location information to the car-sharing service device 20 in S21 to 22.

At this time, the acquisition unit 11 may acquire location information according to a period configured in an application or a request from the car-sharing service device 20.

Here, the location information may include, for example, AP access information and GPS information, and may be transferred to the car-sharing service device 20 together with visual information of the acquired location information while matching identification information (a subscriber ID) of the subscriber terminal 10.

Then, the service unit 12 receives shared-car information in S23.

At this time, when the subscriber terminal 10 is specified as a target requiring the car-sharing service according to the result of the determination by the car-sharing service device 20 based on the transferred location information, the car-sharing service device 20 recommends the common use of the shared car to the service unit 12.

Here, the determination of the target to receive the car-sharing service may be performed based on residence information, which is managed while matching identification information (a subscriber ID) of the subscriber terminal 10.

In connection with this, when it is identified that the plurality of subscriber terminals 10-1, 10-2, . . . , 10-n is located in the particular area based on the received location information, the car-sharing service device 20 may generate a sharing service group for the common use of the shared car in consideration of the moving path of the shared car on the basis of the residence information of each of the plurality of subscriber terminals 10-1, 10-2, . . . , 10-n.

Further, when the sharing service group is generated, the car-sharing service device 20 may provide shared-car information to each subscriber terminal within the generated sharing service group and allow the subscriber terminal to commonly use the shared car.

At this time, the shared-car information may include, for example, the location of the shared car and information on other subscriber terminals within the sharing service group that use the shared car together (for example, phone numbers, residences, and personal information).

Meanwhile, prior to generating the sharing service group and providing the shared-car information, the car-sharing service device 20 may preferentially determine whether to initiate the car-sharing service.

In connection with this, the car-sharing service device 20 may determine whether to initiate the car-sharing service based on traffic condition information in the particular area in which the plurality of subscriber terminals 10-1, 10-2, . . . , 10-n is located at a particular time (for example, a time at which it is difficult to take a taxi since public transportation is not available).

At this time, the car-sharing service device 20 may identify traffic condition information by analyzing an image (for example, a CCT image or a photo) acquired from the particular area in which the plurality of subscriber terminals 10-1, 10-2, . . . , 10-n is located, and when the number of people waiting for a taxi is larger than the reference number of people or the proportion of taxis to all cars is smaller than a preset proportion based on the result of the identification of the traffic condition information through the analysis, may determine to initiate the car-sharing service.

That is, when the plurality of subscriber terminals 10-1, 10-2, . . . , 10-n located in the particular area is identified at the particular time (for example, a time at which it is difficult to take a taxi since public transportation is not available), the car-sharing service device 20 may determine whether to initiate the car-sharing service based on traffic condition information in the corresponding area, and when it is determined to initiate the car-sharing service, may generate a sharing service group to use a shared car together and provide shared-car information to each subscriber terminal within the generated sharing service group.

As a result, when the subscriber terminal 10 is specified as the target requiring the car-sharing service, that is, when the subscriber terminal 10 belongs to the sharing service group according to the operation characteristics of the car-sharing service device 20, the service unit 12 may receive shared-car information from the car-sharing service device 20 and guide the subscriber to use the shared car.

Figure 8:
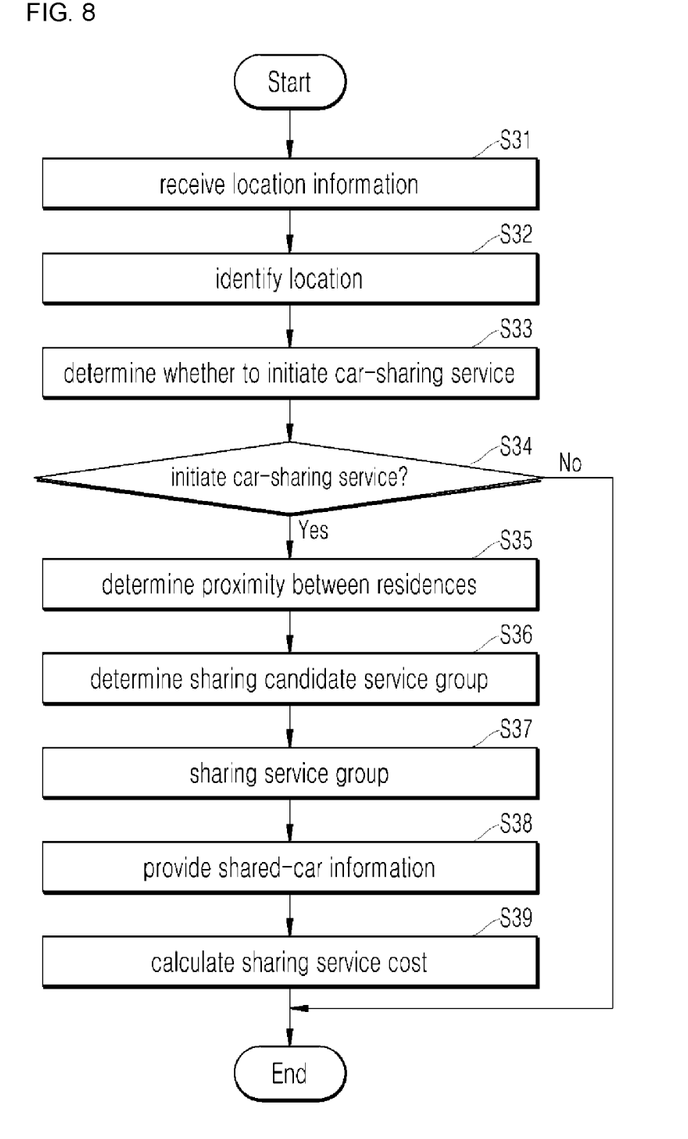
FIG. 8 is a flowchart schematically illustrating an operation flow in the car-sharing service device according to an embodiment of the present disclosure.

The description for the operation flow in the subscriber terminal 10 according to an embodiment of the present disclosure has been completed, and the description of an operation flow in the car-sharing service device 20 will be subsequently made.

In connection with this, FIG. 8 illustrates the operation flow in the car-sharing service device 20 according to an embodiment of the present disclosure.

First, when the plurality of subscriber terminals 10-1, 10-2, . . . , 10-n located in a particular area (for example, a densely populated area) is identified based on location information received from the plurality of subscriber terminals 10-1, 10-2, . . . , 10-n at a particular time (for example, a time at which it is difficult to take a taxi since public transportation is not available), the determination unit 21 determines whether to initiate the car-sharing service based on traffic condition information in the corresponding area in S31 to S33.

At this time, the car-sharing service device 20 may identify traffic condition information by analyzing an image (for example, a CCT image or a photo) acquired from the particular area in which the plurality of subscriber terminals 10-1, 10-2, . . . , 10-n is located, and when the number of people waiting for a taxi is larger than the reference number of people or the proportion of taxis to all cars is smaller than a preset proportion based on the result of the identification of the traffic condition information through the analysis, may determine to initiate the car-sharing service.

Then, when it is identified that the plurality of subscriber terminals 10-1, 10-2, . . . , 10-n is located in the particular area (for example, the densely populated area) at the particular time (for example, a time at which it is difficult to take a taxi since public transportation is not available) and it is determined to initiate the car-sharing service on the basis of traffic condition information in the corresponding area, the generation unit 22 generates a sharing service group to commonly use the shared car in consideration of the moving path of the shared car based on residence information managed while matching in advance identification information of each of the subscriber terminals 10-1, 10-2, . . . , 10-n in S34 to S37.

At this time, the generation unit 22 may generate a sharing service candidate group based on proximity between residences of the subscriber terminals before generating the sharing service group, and may then generate the sharing service group with at least some subscriber terminals that consent to the car-sharing service in real time among the subscriber terminals within the sharing service candidate group.

Here, the proximity between residences may be determined based on information indicating whether a residence of the subscriber terminal is located along an extrapolated line of an azimuth based on the particular area in which the subscriber terminals 10-1, 10-2, . . . , 10-n are located and the distance between the residence and a predefined base area (for example, a subway station or a landmark) in connection with the extrapolated line of the corresponding azimuth.

The proximity between residences is to determine the shortest path for the moving path of the shared car, and may become grounds to determine how close residences of respective subscriber terminals are located.

As a result, the generation unit 22 determines the sharing service candidate group with subscriber terminals having proximity between residences closer than or equal to a threshold value among the plurality of subscriber terminals 10-1, 10-2, . . . , 10-n located in the particular area and further generates the sharing service group with at least some subscriber terminals that consent to the car-sharing service in real time among the subscriber terminals within the sharing service candidate group.

Meanwhile, the moving path of the shared car determined for the sharing service group may be set to have, as the destination, a residence of a particular subscriber terminal, which is the farthest from a particular area, among the subscriber terminals within the sharing service group, and may be set to have, as stops, residences of the remaining subscriber terminals.

Further, when the sharing service group is generated, the provision unit 23 provides shared-car information to each of the subscriber terminals within the sharing service group and allows the subscriber terminals to commonly use the shared car in S38.

At this time, the shared-car information may include, for example, the location of the shared car and information on other subscriber terminals within the sharing service group that use the shared car together (for example, phone numbers, residences, and personal information).

Thereafter, the cost calculation unit 24 calculates a sharing service cost for each subscriber terminal within the sharing service group in S39.

At this time, the cost calculation unit 24 may charge a basic service cost per moving distance to each subscriber terminal within the sharing service group and calculate the sharing service cost for each subscriber terminal by additionally applying a discount rate to the basic service cost according to the number of stops before arrival at each residence.

That is, the cost calculation unit 24 charges the basic service cost per moving distance to each subscriber terminal within the sharing service group but additionally applies a corresponding discount rate to the subscriber terminal that passes a larger number of stops, thereby compensating for the cost according to the time delay due to the stops.

As described above, according to the car-sharing service system and a method of operating each element within the system according to an embodiment of the present disclosure, it is possible to guarantee convenience of use of the car-sharing service and promote an increase in participation in the service by providing an environment in which targets requiring the car-sharing service may be specified and the common use of a shared car may be recommended to each of the specified targets.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the terms "system" and "device", for example, cover a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. A car-sharing service device comprising:
   a processor configured to process to provide a car-sharing service; and
   a memory configured to store at least one command executed through the processor,
   wherein the at least one command comprises:
      a traffic condition information identification command of determining a traffic condition within a particular area at a particular time;
      a location information acquisition command of receiving, from a plurality of subscriber terminals, an input signal identifying locations of the subscriber terminals;
      a generation command of generating a sharing service group to use a shared car according to a moving path of the shared car when the traffic condition indicate that public transportation is not available at the particular time, the sharing group being determined based on the locations of the subscriber terminals in the particular area; and
      a control command of transmitting an output signal providing shared-car information to each of a subset of the subscriber terminals within the sharing service group and allowing users of the subscriber terminals within the sharing service group to use the shared car, and
   wherein the sharing service group is selected from a sharing service candidate group with subscriber terminals in the particular area and having a proximity that is less than or equal to a threshold, and
   wherein the sharing service group is selected from the sharing service candidate group based on the proximities of the subscriber terminals to determine a shortest moving path of the shared car.

2. The car-sharing service device of claim 1, wherein the traffic condition information is identified from a result of analysis of an image acquired for the particular area, and
   the determination command comprises determining to initiate the car-sharing service when at least one of a number of people waiting for public transportation is greater than a reference number of people or when a proportion of public transportation vehicles to all vehicles in the particular area is less than a set proportion according to the result of analysis of the image.

3. The car-sharing service device of claim 1, wherein the generation command comprises:
   generating the sharing service group from ones of the subscriber terminals that consent to the car-sharing service in real time from the subscriber terminals within the sharing service candidate group.

4. The car-sharing service device of claim 1, wherein the proximity of the subscriber terminals is determined based on at least one of respective distances between the locations of the subscriber terminals and a line extrapolated through the particular area, or respective distances between the locations of the subscriber terminals and a base area predefined in connection with the line.

5. The car-sharing service device of claim 1, wherein the moving path of the shared car is set to have, as a destination, a location of a particular one of the subscriber terminals of the sharing service group which is farthest from an area and set, as stops, locations of the remaining ones of the subscriber terminals in the sharing service group.

6. The car-sharing service device of claim 5, wherein the at least one command further comprises a cost calculation command of calculating a sharing service cost according to use of the shared car, and
   the sharing service cost is calculated by applying a discount rate to a basic service cost based on moving distance for each subscriber terminal within the sharing service group, the discount rate being determined according to a number of the stops before arrival at each location.

7. The car-sharing service device of claim 1, wherein the shared-car information includes at least one of information identifying a location of the shared car or information identifying each of the subscriber terminals within the sharing service group.

8. A method of operating a car-sharing service device, the method comprising:
   determining a traffic condition within a particular area at a particular time;
   receiving, from a plurality of subscriber terminals, an input signal identifying locations of the subscriber terminals;
   generating a sharing service group to commonly use a shared car according to a moving path of the shared car when the traffic condition indicate that public transportation is not available in the particular area at the particular time, the sharing service group being generated based on the locations of the subscriber terminals in the particular area; and
   transmitting an output signal providing shared-car information to each of a subset of the subscriber terminals within the sharing service group and allowing the subscriber terminals to commonly use the shared car,
   wherein the sharing service group is selected from a sharing service candidate group with subscriber terminals in the particular area and having a proximity that is less than or equal to a threshold, and
   wherein the sharing service group is selected from the sharing service candidate group based on the proximities of the subscriber terminals to determine a shortest moving path of the shared car.

9. The method of claim 8, wherein the traffic condition information is identified from a result of analysis of an image acquired in the particular area, and the determining of whether to initiate the car-sharing service comprises determining to initiate the car-sharing service when at least one of a number of people waiting for public transportation is greater than a reference number of people or when a proportion of public transportation vehicles to all vehicles in the particular area is less than a set proportion according to the result of analysis of the image.

10. The method of claim 8, wherein the generating comprises:
generating the sharing service group with at least some subscriber terminals that consent to the car-sharing service in real time from the subscriber terminals within the sharing service candidate group.

11. The method of claim 8, wherein the proximity between the subscriber terminals is determined based on at least one of respective distance between locations of the subscriber terminals and a line extrapolated in the particular area, or respective distances between the locations of the subscriber terminals and a base area predefined in connection with the line.

12. A device comprising:
a processor; and
a memory configured to store at least one command, the at least one command, when executed by the processor, cause the processor to:
receive an input signal including an image of a particular area;
determine whether to initiate a car-sharing service based on traffic condition information in the particular area at a particular time from a result of analysis of the image acquired for the particular area, wherein the processor determines to initiate the car-sharing service when at least one of a number of people waiting for public transportation is greater than a reference number of people or when a proportion of public transportation vehicles to all vehicles in the particular area is smaller than a set proportion according to a result of analysis of the image;
based on determining to initiate the car-sharing service, generate the sharing service group to use a shared car according to a moving path of the shared car, the sharing group being determined based on location information of terminals located in a particular area;
set the moving path of the shared car based on the location information of the terminals included in the sharing service group; and
transmit an output signal to provide shared-car information to each of a subset of the terminals within the sharing service group to allow users of the sharing service group to use the shared car.

13. The device of claim 12, wherein at least one command, the at least one command, when executed by the processor, further cause the processor to:
determine a sharing service candidate group with terminals having a proximity closer than or equal to a threshold from the terminals located in the particular area and
generate the sharing service group with at least some terminals that consent to the car-sharing service in real time from terminals within the sharing service candidate group.

14. The device of claim 13, wherein the proximity between the terminals is determined based on at least one of distances between the terminals and a line extrapolated in the particular area, or distances between the terminals and a base area predefined in connection with the line.

15. The device of claim 13, wherein the sharing service group is based on the proximity of the subscriber terminals to determine a shortest moving path of the shared car.

16. The device of claim 12, wherein the moving path of the shared car is set to have, as a destination, a location of a particular terminal which is farthest from the particular area among the terminals within the sharing service group and set, as stops, locations of remaining ones of the terminals of the sharing service group.

17. The device of claim 16, wherein at least one command, when executed by the processor, further cause the processor to:
calculate a sharing service cost according to use of the shared car based on applying a discount rate to a basic service cost based on a moving distance for each terminal within the sharing service group, the discount rate being determined according to a number of the stops before arrival at each location.

* * * * *